(No Model.)
G. W. PLYMELL.
HITCHING ATTACHMENT FOR CULTIVATORS.
No. 350,319. Patented Oct. 5, 1886.
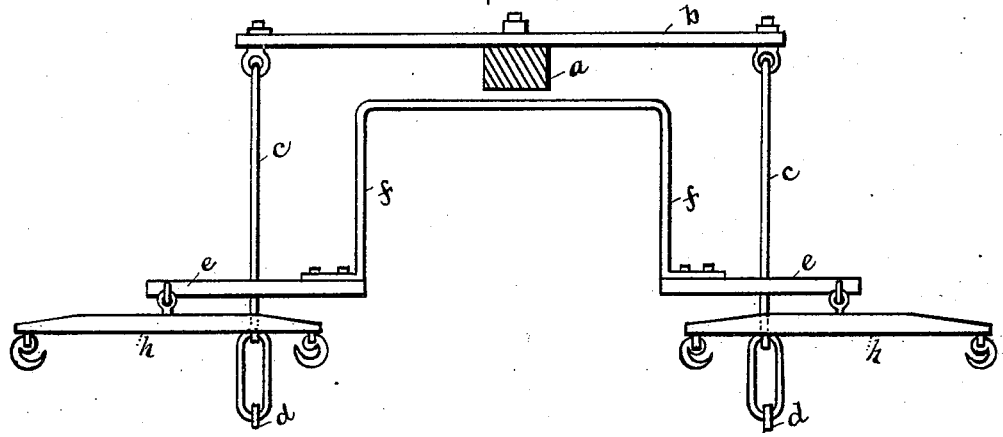
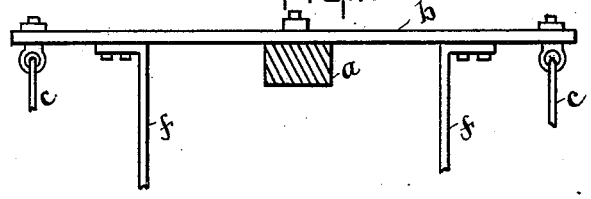
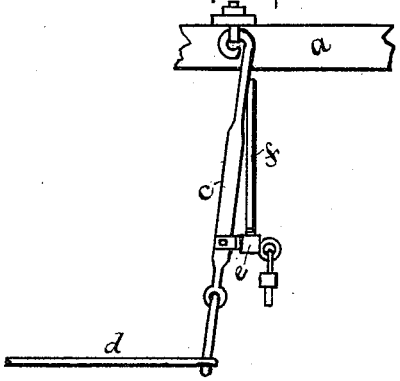
WITNESSES
W. S. Shepherd.
H. N. Price.
INVENTOR
George W. Plymell
By his Attorney C. C. Shepherd.

UNITED STATES PATENT OFFICE.

GEORGE W. PLYMELL, OF NEAR LONDON, OHIO.

HITCHING ATTACHMENT FOR CULTIVATORS.

SPECIFICATION forming part of Letters Patent No. 350,319, dated October 5, 1886.

Application filed June 16, 1886. Serial No. 205,335. (No model.)

*To all whom it may concern:*

Be it known that I, GEORGE W. PLYMELL, a citizen of the United States, residing near London, in the county of Madison and State of Ohio, have invented a certain new and useful Improvement in Hitching Attachments for Corn-Cultivators, of which the following is a specification.

My invention relates to improvements in that class of cultivator-plows in which the single-trees are secured to the draft-pendants made to hang from the outer end of a bar extending transversely across the top of the tongue; and the object of my improvements are to so construct a simple, cheap, and effective single-tree hitching device for this class of cultivators as to increase the distance between the single-trees, and thus prevent the horses from crowding together between the furrows and tramping down the corn. These objects I accomplish in the manner illustrated in the accompanying drawings, in which—

Figure 1 is a front elevation of the draft-pendant, showing my improvements secured thereto; and Fig. 2 is a side elevation of the same; and Fig. 3 is a modification of the hitch-bar connection.

Similar letters refer to similar parts throughout the several views.

$a$ represents the tongue of a two-horse corn-cultivator having a cross-bar, $b$, thereon, to outer ends of each of which is secured in the usual manner the draft-pendants $c$, the latter extending downward and connecting by means of links or otherwise with the draft-rods $d$. Rigidly secured at about the center of its length to the lower half of each of the draft-pendants $c$ by means of bolts or otherwise is a short transverse hitch-bar, $e$, preferably of wood. The inner corresponding ends of these bars $e$ are preferably connected by means of a metal rod, $f$, having its center bowed upward to prevent its interfering with the growing corn, and having its lower ends bolted or otherwise secured to the top sides and near the inner ends of the bars $e$. This connection-rod, however, may be made of two parts, as shown in Fig. 3 of the drawings, each of said parts extending vertically upward from its bar $e$ and having its upper end bolted to the bottom of the cross-bar $b$.

The front side of each of the bars $e$ is provided near its outer end with a projecting ring or staple, to which a single-tree, $h$, may be hooked in the usual manner.

It will readily be seen that by the use of the above-described attachment the single-trees are in such position as to keep the horses apart and greatly facilitate the operation of plowing.

Having now fully described my invention, what I claim, and desire to secure by Letters Patent, is—

In a hitching attachment for corn-cultivators, the combination, with tongue cross-bar $b$ and draft-pendants $c$, of the connected hitch-bars $e$, being rigidly secured on their rear side to the pendants $c$, and having a single-tree connection on their front side near their outer ends, substantially as and for the purpose specified.

GEORGE W. PLYMELL.

Witnesses:
C. R. GILMORE,
W. S. SHEPHERD.